(12) United States Patent
Suguro et al.

(10) Patent No.: US 10,312,494 B2
(45) Date of Patent: Jun. 4, 2019

(54) TAB LEAD INCLUDING SURFACE TREATMENT FILM WITH POLYMER HAVING CARBOXYLIC ACID ANHYDRIDE GROUPS, AND NONAQUEOUS ELECTROLYTE SECONDARY BATTERY USING THE SAME

(71) Applicant: Automotive Energy Supply Corporation, Zama-shi, Kanagawa (JP)

(72) Inventors: Masahiro Suguro, Zama (JP); Hiromoto Taguchi, Zama (JP); Yuji Tanjo, Zama (JP)

(73) Assignee: AUTOMOTIVE ENERGY SUPPLY CORPORATION, Kanagawa (JP)

( * ) Notice: Subject to any disclaimer, the term of this patent is extended or adjusted under 35 U.S.C. 154(b) by 191 days.

(21) Appl. No.: 15/046,737

(22) Filed: Feb. 18, 2016

(65) Prior Publication Data

US 2016/0248074 A1    Aug. 25, 2016

(30) Foreign Application Priority Data

Feb. 23, 2015   (JP) ................. 2015-032654

(51) Int. Cl.
| | |
|---|---|
| *H01M 2/02* | (2006.01) |
| *H01M 2/06* | (2006.01) |
| *H01M 2/08* | (2006.01) |
| *H01M 2/26* | (2006.01) |
| *H01M 2/30* | (2006.01) |
| *H01M 10/0525* | (2010.01) |
| *H01M 10/0585* | (2010.01) |

(52) U.S. Cl.
CPC ........... *H01M 2/30* (2013.01); *H01M 2/0275* (2013.01); *H01M 2/06* (2013.01); *H01M 2/08* (2013.01); *H01M 2/26* (2013.01); *H01M 10/0525* (2013.01); *H01M 10/0585* (2013.01)

(58) Field of Classification Search
CPC ........ H01M 2/26; H01M 2/0275; H01M 2/06; H01M 2/08; H01M 2/30; H01M 10/0585; H01M 10/0525
USPC .......................... 429/178, 179, 180, 181, 184
See application file for complete search history.

(56) References Cited

U.S. PATENT DOCUMENTS

2008/0254360 A1* 10/2008 Miyazawa ............ H01M 2/021
    429/184
2010/0221601 A1* 9/2010 Fukuda ............... H01M 2/0275
    429/185

FOREIGN PATENT DOCUMENTS

| | | |
|---|---|---|
| JP | H06-65041 B2 | 8/1994 |
| JP | H11-086842 A | 3/1999 |

(Continued)

OTHER PUBLICATIONS

Nishijima et al. Machine translation of JP 2011-159569 A, dated Aug. 2011 (Year: 2011).*

(Continued)

*Primary Examiner* — Sean P Cullen
(74) *Attorney, Agent, or Firm* — Troutman Sanders LLP

(57) ABSTRACT

Provided is a tab lead for a secondary battery including tab lead metal that has an adhesion interface with sealing resin. The adhesion interface is provided with a surface treatment film formed of a material including a polymer with carboxylic acid anhydride groups. Further provided is a nonaqueous electrolyte secondary battery including the tab lead for the secondary battery as a leading terminal of at least one of a positive electrode and a negative electrode.

15 Claims, 1 Drawing Sheet

(56) References Cited

FOREIGN PATENT DOCUMENTS

| JP | 2011081992 A | | 4/2011 |
| JP | 2011159569 A | * | 8/2011 |
| JP | 2014107176 A | * | 6/2014 |
| WO | 2014/200087 A1 | | 12/2014 |

OTHER PUBLICATIONS

Matsumura et al., Machine translation of JP 2014-107176 A, dated Jun. 2014 (Year: 2014).*
Nishijima et al., Human Translation of JP 2011-159569 A, dated Aug. 2011 (Year: 2011).*
Extended European Search Report dated Jun. 27, 2016 for the corresponding European Patent Application No. 16156337.4.
Communication pursuant to Article 94(3) EPC for EP Patent Application No. 16156337.4.

* cited by examiner

TAB LEAD INCLUDING SURFACE TREATMENT FILM WITH POLYMER HAVING CARBOXYLIC ACID ANHYDRIDE GROUPS, AND NONAQUEOUS ELECTROLYTE SECONDARY BATTERY USING THE SAME

CROSS-REFERENCE TO RELATED APPLICATION

This application claims priority from Japanese Patent Application No. 2015-32654 filed with the Japan Patent Office on Feb. 23, 2015, the entire content of which is hereby incorporated by reference.

BACKGROUND

1. Technical Field

The present disclosure relates to a tab lead for a secondary battery, and a nonaqueous electrolyte secondary battery using the tab lead.

2. Related Art

A secondary battery whose battery element is covered with a laminated film as a package has been known. A leading terminal of the battery (also called a laminated battery) including such a laminated film package (also called a laminated package) is referred to as a tab lead.

For the tab lead, conductive metal is mainly used. In some known techniques, when the laminated package housing the secondary battery is sealed, a surface treatment film with corrosion resistance is formed at the interface between the sealing resin (sealant) and the tab lead metal. JP-A-2011-81992 discloses a method for manufacturing a lead member, the method including: forming a composite film layer by applying a solution, which includes a resin component containing polyacrylic acid and polyacrylic acid amide and a metal salt, through spraying onto a surface of a metal member; and attaching an insulator from each surface side of the metal member.

SUMMARY

A tab lead according to the present embodiment includes tab lead metal, the tab lead metal having an adhesion interface with sealing resin. The adhesion interface is provided with a surface treatment film formed of a material including a polymer with carboxylic acid anhydride groups.

DETAILED DESCRIPTION

Figure 1:
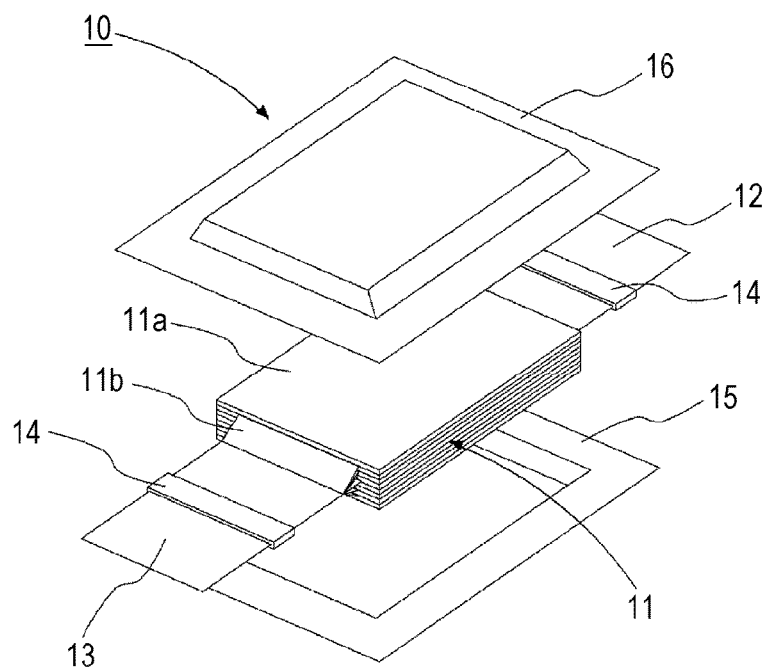
FIG. 1 is an exploded perspective view illustrating a structure of a nonaqueous electrolyte secondary battery according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As the battery is increased in size, the tab sealing reliability of a higher level is required so that the sealing property can be secured for the long use. An object of the present disclosure is to provide a tab lead with higher sealing reliability to be used for a nonaqueous electrolyte secondary battery.

For achieving the above object, a tab lead provided with a surface treatment film including a novel chemical bond on the tab lead metal is provided.

According to an aspect of the present disclosure, a tab lead includes tab lead metal, the tab lead metal having an adhesion interface with sealing resin. The adhesion interface is provided with a surface treatment film formed of a material including a polymer with carboxylic acid anhydride groups.

According to another aspect of the present disclosure, a nonaqueous electrolyte secondary battery having the tab lead as a leading terminal of at least one of a positive electrode and a negative electrode is provided.

According to another aspect of the present disclosure, the adhesion strength of the surface treatment film to be formed and the resistance thereof against the electrolyte solution are improved. Moreover, the sealing reliability by the sealing resin is improved.

Description is hereinafter made of a tab lead for a secondary battery, and a nonaqueous electrolyte secondary battery using the tab lead according to an embodiment of the present disclosure (hereinafter simply referred to as "tab lead" and "secondary battery", respectively). FIG. 1 is an exploded perspective view of a laminated nonaqueous electrolyte secondary battery 10 according to one embodiment of the present disclosure. In this embodiment, a lithium ion secondary battery is assumed. The secondary battery 10 according to the embodiment includes: a battery element 11 with an approximately rectangular parallelepiped shape having a structure where a plurality of positive electrodes and a plurality of negative electrodes are stacked; a positive electrode tab lead 12 and a negative electrode tab lead 13 connected to the positive electrodes and the negative electrodes of the battery element 11, respectively; packages 15 and 16 that are heat-sealed to an extended part of the positive electrode tab lead 12 and the negative electrode tab lead 13 around the battery element 11; and sealing resin 14 (sealant) interposed between the package and the tab lead. The battery element 11 has a structure in which the plural positive electrodes and the plural negative electrodes are alternately stacked with the separator interposed therebetween. The battery element 11 includes a joint portion 11b which helps the connection between an electrode multilayer portion 11a, where these are stacked and which includes an electrolyte solution, and the positive electrode tab lead 12 and negative electrode tab lead 13. The joint portion 11b corresponds to an integrally extended part of the positive electrode or the negative electrode included in the electrode multilayer portion 11a. The joint portion 11b constitutes a part of a positive electrode current collector or a negative electrode current collector. In this example, the joint portions 11b for the positive electrode tab lead 12 and the negative electrode tab lead 13 extend from opposite sides of the battery element 11. That is to say, the positive electrode tab lead 12 and the negative electrode tab lead 13 are extracted from the secondary battery 10 in directions opposite to each other.

Figure 2:
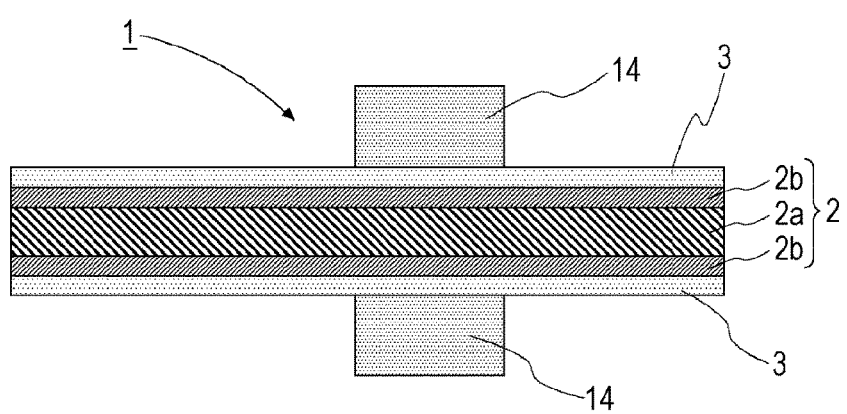
FIG. 2 is a schematic sectional view illustrating the summary of a tab lead for a secondary battery according to an embodiment of the present disclosure.

FIG. 2 is a schematic sectional view of a tab lead 1 according to an embodiment of the present disclosure. Here, a surface treatment film 3 according to the embodiment is formed on a surface of tab lead metal 2 for the negative electrode tab lead including a copper plate 2a covered with nickel plating layers 2b. FIG. 1 illustrates a structure including the sealing resin (sealant) 14 disposed on an adhesion surface between the packages 15 and 16.

The tab lead according to the embodiment is featured in that the surface treatment film 3 is formed of a material including polymer with carboxylic acid anhydride groups.

The surface treatment film is hereinafter described in detail. The surface treatment film according to the embodiment is formed of the material including polymer with carboxylic acid anhydride groups. As indicated by the following formula (1), two carboxylic groups at the side chain of polymer form an acid anhydride group through dehydration condensation.

[Chemical Formula 1]

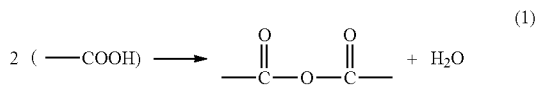

(1)

In particular, it is preferable that the carboxylic groups at the different polymer chains form the crosslinked structure with the acid anhydride groups through dehydration condensation. It is considered that when the amount of crosslinked structures is increased, the film itself has higher strength, and moreover the sealing adhesion is increased.

On the other hand, in JP-A-2011-81992, the solution which includes the resin component containing polyacrylic acid and polyacrylic acid amide and the metal salt is applied through spraying, thereby forming the composite film layer on the metal surface. In the method according to JP-A-2011-81992, however, the dehydration condensation of the carboxylic groups does not occur, and accordingly the acid anhydride groups are not formed.

In the embodiment, the dehydration condensation of the carboxylic acid groups is promoted so that the acid anhydride groups are formed on purpose.

The surface treatment film 3 of the embodiment may be formed by heating the surface of the tab lead metal 2 which is immersed in the polycarboxylic acid aqueous solution and which is in contact with the sealing resin 14, under the reaction condition where the acid anhydride groups as above are generated. The surface treatment film 3 of the embodiment can be formed by immersing the tab lead metal 2 in the polycarbonate aqueous solution and then performing heat treatment under the reaction condition where the acid anhydride groups as above are generated. This film can be formed at least on a contact surface where the tab lead metal 2 is in contact with the sealing resin 14. The polycarboxylic acid to be used is not particularly limited. Examples of polycarboxylic acid include homopolymers and copolymers prepared by using one or more kinds of unsaturated carboxylic acids such as acrylic acid, methacrylic acid, and crotonic acid. Moreover, alkaline metal salts thereof (such as sodium salt) can be used. The copolymer may be the copolymer whose monomer other than the unsaturated carboxylic acid is used in the range that does not deteriorate the advantageous effects of the embodiment. The particularly preferable polycarboxylic acid is the polyacrylic acid and polymethacrylic acid and sodium salt thereof (neutralized one). In the present specification, the polyacrylic acid and polymethacrylic acid and the sodium salt thereof (neutralized one) are collectively referred to as "poly(meth)acrylic acid."

The polymer included in the material of the surface treatment film 3 preferably includes both the carboxylic acid anhydride groups formed by dehydration condensation and the unreacted carboxylic groups. It is particularly preferable that the number of carboxylic acid anhydride groups is more than the number of carboxylic groups. That the number of carboxylic acid anhydride groups is more than the number of carboxylic groups can be confirmed by the Raman spectroscopic analysis of the polymer included in the material of the surface treatment film 3. That is to say, the number of carboxylic acid anhydride groups is more than the number of carboxylic groups when the peak intensity of the carboxylic acid anhydride group is more than the peak intensity of the carboxylic group. The ratio of the peak intensity of the carboxylic acid anhydride group to the peak intensity of the carboxylic group (acid anhydride/COOH) is preferably more than 1 and 4 or less.

The polycarboxylic acid is dissolved in an appropriate solvent, such as water, and then the obtained solution is applied to the surface of the tab lead metal 2. The method of applying the solution is not particularly limited. The application may be conducted by a dipping method in which the tab lead metal is immersed in the polycarboxylic acid solution, a method in which the polycarboxylic acid solution is applied with a brush or the like, or a spraying method (jetting method) as disclosed in JP-A-2011-81992.

The surface treatment film 3 can provide the advantageous effects even if it has very small thickness. In this embodiment, the thickness of the surface treatment film 3 is preferably 10 to 100 nm, more preferably 20 to 80 nm. Alternatively, the amount of carbon in the surface treatment film is preferably 10 μg/cm² or more and 20 μg/cm² or less. In this embodiment, the adhesion amount and concentration of the polymer solution to be applied are adjusted so that the surface treatment film 3 has predetermined thickness or the amount of carbon in the surface treatment film becomes a predetermined value. Alternatively, a plurality of surface treatment films 3 may be formed by repeating the application and thermal treatment. In this case, the layers may be formed by using the same polycarboxylic acid solution or different polycarboxylic acid solution. The amount of carbon can be calculated by the high-frequency combustion-infrared absorption method.

In some cases, the use of the solution with relatively low concentration is advantageous in forming the uniform surface treatment film 3. The polycarboxylic acid solution can be, for example, an aqueous solution containing approximately 35 to 45 mass % of poly(meth)acrylic acid.

For the tab lead metal as the base material for forming the surface treatment film 3, the copper plate provided with the nickel plating layer is used in the example illustrated in FIG. 2. However, the tab lead metal is not limited thereto. Any known suitable material can be selected and used in accordance with the characteristics of the electrode element. Examples of such material include the positive electrode tab lead metal and the negative electrode tab lead metal selected in accordance with the characteristics of the battery element from nickel, copper, and aluminum.

The size of the tab lead is not particularly limited. The optimum size can be selected in accordance with the shape, capacity, and the like of the secondary battery to be formed. In particular, the tab lead according to the embodiment can be advantageously used for the secondary battery which is increased in size. That is to say, since this tab lead is wide, the tab lead is suitable for the laminated secondary battery with the wide sealing width. In this embodiment, in particular, a flat plate-shaped metal lead with a sectional area as large as 3 mm² or more is used as the tab lead metal. Such a large flat plate-shaped metal lead can be used for the secondary battery with the structure applicable to the large-current charging and discharging. The ratio of the width/thickness of the flat plate-shaped metal lead may be 150 or more. The width of the flat plate-shaped metal lead corresponds to the length along the sealing side of the tab lead. The thickness of the flat plate-shaped metal lead corresponds to the length along the direction perpendicular to the surface of the flat plate-shaped metal lead. As the sectional area is larger and the ratio of width/thickness is larger, the width becomes remarkably larger. In this case, it is more important to secure the sealing reliability of the tab lead extracting portion. The tab lead according to the embodiment is very advantageous to be used for the secondary battery designed in this manner.

Next, a nonaqueous electrolyte secondary battery according to the embodiment is described. In the example illustrated in FIG. 1, the electrode stack including the plural positive electrodes and negative electrodes that are stacked with the separator interposed therebetween is shown as the battery element 11. However, the mode of the battery element 11 used in this embodiment is not limited thereto. Other modes of the battery element that can be used are a battery element obtained by simply stacking two or more sets of flat plate-shaped electrode stacks, a battery element obtained by winding a rectangular electrode stack, and a battery element obtained by winding a flat electrode stack.

[Positive Electrode]

Any material capable of intercalating positive ions or deintercalating negative ions in discharging can be used for the positive electrode without particular limitation. Any known material can be used as a material for the positive electrode of the secondary battery. Examples of the applicable material include (i) metal oxides such as lithium nickel composite oxide, lithium cobalt composite oxide, lithium nickel cobalt manganese composite oxide, lithium manganese composite oxide with a spinel structure, $LiMnO_2$, $LiMn_2O_4$, $LiCoO_2$, and $LiNiO_2$, and (ii) conductive polymer such as polyacetylene and polyaniline.

The positive electrode active material (not shown) used for the positive electrode may contain appropriate binder or other functional material. Examples of the binder include halogen-containing polymer such as polyvinylidene fluoride. Examples of the functional material include a conductive polymer for providing electron conductivity such as acetylene black, polypyrrole, and polyaniline, and a polymer electrolyte and its complex body for providing ion conductivity.

[Negative Electrode]

Any material capable of intercalating or deintercalating cations can be used for the negative electrode without particular limitation. Any known material can be used as a material for the negative electrode of the secondary battery. Examples of such material include natural graphite, crystalline carbon such as graphitized carbon obtained by heating coal, petroleum pitch or the like at high temperature, amorphous carbon obtained by heating coal, petroleum pitch cokes, acetylene pitch cokes or the like, and lithium alloy such as AlLi.

[Nonaqueous Electrolyte Solution]

Examples of the nonaqueous electrolyte solution include a solution obtained by dissolving a salt, which includes a cation of alkaline metal and an anion of a halogen-containing compound, in a basic solvent with high polarity. Examples of the basic solvent with high polarity that can be used for the electrolyte solution for the secondary battery include ethylene carbonate, propylene carbonate, dimethyl carbonate, diethyl carbonate, methylethyl carbonate, γ-butyrolactone, N,N'-dimethyl formamide, dimethyl sulfoxide, N-methyl pyrrolidone, and m-cresol. Examples of the cation of alkali metal include cations of LiK and Na. Examples of the anion of the halogen-containing compound include $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$, and $(C_2F_5SO_2)_3C^-$. Among these, the salt is preferably the salt of lithium and inorganic fluoride, such as $LiPF_6$, from the viewpoint of ionic conductivity. The use of this salt provides the advantageous effect of this embodiment for the electrolyte solution including the inorganic fluoride-lithium salt which easily generates fluorinated acid. Above all, the particularly preferable salt is $LiPF_6$ from the viewpoint of ionic conductivity. Any solvent and salt selected from these solvent electrolyte salts including the basic solvents can be used alone or in combination. A gel-like electrolyte such as polymer gel including the electrolyte solution may alternatively be used.

[Package]

Preferable examples of the package includes a laminated film including a stack of a metal thin film with a gas barrier property and a polymer resin thin film capable of thermal bonding. The thickness and the like of each layer in the stack are not particularly limited. General examples of the protective layer with heat resistance (not shown), which is located at the outermost side of the packages 15 and 16, include polyester, polyamide, and liquid crystal polymer. Examples of the sealant layer at the innermost side include polyethylene, polypropylene, ionomer, acid modified polyethylene such as maleic acid modified polyethylene, acid modified polyolefin such as acid modified polypropylene typified by maleic acid modified polypropylene, polyethylene terephthalate (PET), polyethylene naphthalate (PEN), polyethylene isophthalate (PEI), a blend of PET and PEN, a blend of PET and PEI, polyamide resin, a blend of polyamide resin and PET, and a blend of polyamide containing xylene groups and PET, and other thermoplastic resins. Two or more layers can be combined as necessary to form the packages 15 and 16. The layers may be attached to each other through welding or with adhesive. Examples of the metal layer with the gas barrier property include Al, Sn, Cu, Ni, or stainless steel. The thickness of the metal layer is preferably 30 to 50 μM.

The packages 15 and 16 may have another structure with a thermally bondable polymer resin layer. Examples of such a package include a single film of any of the aforementioned thermoplastic resins, and a stack including the thermoplastic resin film and a heat-resistant resin film with the excellent gas barrier property. As illustrated in FIGS. 1 and 2, the sealant 14 may be formed in advance in the sealing portion of the tab lead 1, and then the packages 15 and 16 may be thermally bonded (heat sealed). Examples of the sealant 14 include a thermoplastic resin used for the sealant layer of the package. The preferable sealant is the acid modified polyolefin. The sealant layer of the package may also serve as the sealant 14. In other words, for example, the sealant layer of the package formed of the acid modified polyolefin may be directly thermally bonded to the tab lead.

[Heat Sealing Method]

The heating process for heat-sealing the package of the laminated nonaqueous electrolyte secondary battery may be conducted by, for example, the following method: a method in which a heater including a ribbon-shaped or block-shaped metal resistor is pressed against a target to be sealed from above and below and then current is fed to the heater for a predetermined period of time, thereby generating heat; a method in which a metal block maintained to have constant temperature is pressed against the target to be sealed from above and below for a predetermined period of time; and a method in which the lead terminal is selectively heated through high-frequency inductive heating with the target pressed, or Joules heat is generated by generating an eddy current in the lead terminal by another method, so that the sealant layer and the sealant 14 of the laminated film are melted with the heat from the tab lead side to enable the thermal bonding.

[Thin Secondary Battery]

The method for manufacturing the laminated nonaqueous electrolyte secondary battery according to this embodiment of the present disclosure is not particularly limited. For example, the following manufacturing method is given. First, a part of the positive electrode tab lead 12 and the negative electrode tab lead 13 as the metal flat plate is connected to the battery element 11 through ultrasonic welding or the like. Next, these are disposed at the predetermined positions on the packages. Then, the area (brim part) of the packages 15 and 16 overlapping with the positive electrode and negative electrode tab leads 12 and 13 is thermally bonded. After that, one side of the other than one side thereof among the sides that do not correspond to the tab lead extracting portion is thermally bonded. Next, the electrolyte solution is poured and the last one side is thermally bonded under reduced pressure. As for the direction where the positive and negative electrode tab leads of the laminated nonaqueous electrolyte secondary battery of the present disclosure are extracted, the positive electrode tab lead and the negative electrode tab lead are not necessarily extracted to the opposite directions. The positive and negative electrode tab leads may alternatively be extracted from the same side in the same direction.

EXAMPLES

This embodiment is more specifically based on examples. This embodiment, however, is not limited to the examples only.

Examples 1 to 6, Comparative Examples 1 to 3

The metal surface of the tab lead with a size of 50 mm×90 mm×0.2 mm (nickel plated copper) was immersed in polyacrylic acid (abbreviation: PAA, 35 to 45% aqueous solution, product name "poly(acrylic acid sodium salt)" of Sigma-Aldrich). After that, the reaction was caused on a hot plate set in advance to have a heating temperature of 120° C., thereby forming a surface treatment film. In the formation of the surface treatment film, the reaction condition was changed as shown in Table 1. With the use of the tab lead formed thus, the laminated battery was manufactured.

The reaction ratio of the carboxylic acid anhydride in the obtained surface treatment film was evaluated through the Raman spectroscopic analysis. According to the Raman spectroscopic analysis, the wavelength of the excited light was 532 nm. As the peak intensity of CH, the peak intensity around 2954 $cm^{-1}$ was read. As the peak intensity of COOH, the peak intensity around 1593 $cm^{-1}$ was read. As the peak intensity of the acid anhydride, the peak intensity around 1050 $cm^{-1}$ was read. The intensity ratio among these read peak intensities was evaluated. The results are shown in Table 1.

<Procedure of Manufacturing Battery>

The lithium manganate powder with a spinel structure, the carbon conductivity providing material, and polyvinylidene fluoride were mixed and dispersed in NMP at a weight ratio of 90:5:5. The obtained mixture was stirred to prepare the slurry. The amount of NMP was adjusted so that the slurry had appropriate viscosity. With the use of a doctor blade, this slurry was applied uniformly on one surface of a 20-μm-thick aluminum foil serving as a positive electrode current collector. The slurry was applied so that a very small amount of stripe-shaped uncoated portion (where the current collector is exposed) was left. Next, this was dried in vacuum at 100° C. for two hours. The slurry was applied to the other surface and dried in vacuum similarly. On this occasion, the slurry was applied so that the position of the uncoated portion coincides on the front and back sides. Then, the sheet with the active material applied on both surfaces was rolled and pressed. This was cut into eight rectangles including the uncoated portion. The active material uncoated portion serves as a portion to be connected to the lead terminal. In this manner, the positive electrode with a theoretical capacity of 3 Ah in total was prepared.

On the other hand, the amorphous carbon powder and polyvinylidene fluoride were mixed and dispersed in NMP at a weight ratio of 91:9. The obtained mixture was stirred to prepare the slurry. The amount of NMP was adjusted so that the slurry had appropriate viscosity. This slurry was applied uniformly on one surface of a 10 μm-thick copper foil serving as a negative electrode current collector with the doctor blade. The slurry was applied so that a very small amount of stripe-shaped uncoated portion (where the current collector is exposed) was left. Next, this was dried in vacuum at 100° C. for two hours. On this occasion, the thickness of the active material layer was adjusted so that the theoretical capacity per unit area of the negative electrode layer and the theoretical capacity per unit area of the positive electrode layer were 1:1. The slurry was applied to the other surface and dried in vacuum similarly. In this manner, the sheet with the active material applied on both surfaces was rolled and pressed. This was cut into nine rectangles including the uncoated portion, each rectangle being larger than the positive electrode by 2 mm vertically and horizontally. The active material uncoated portion serves as a portion to be connected to the lead terminal. In this manner, the negative electrode was prepared.

The positive electrodes and negative electrodes prepared as above were stacked with the separator interposed therebetween. The rectangular microporous separator made of polypropylene had the size larger than the negative electrode by 2 mm vertically and horizontally, and a thickness of 30 μm. The outermost electrode was a negative electrode. On the outer side of the negative electrode as the outermost electrode, the separator was disposed (the order is: separator/negative electrode/separator/positive electrode/separator/ . . . /negative electrode/separator). The electrodes were directed so that the active material uncoated portion of the positive electrode and the active material uncoated portion of the negative electrode were located to be opposite to each other. This is in order to have the positive electrode lead terminal and the negative electrode lead terminal extracted from the opposite two sides. Next, the aluminum plate with a predetermined thickness, a predetermined width, and a length of 50 mm as the positive electrode tab lead, and the active material uncoated portions of the eight positive electrodes were collectively welded with ultrasonic waves. Similarly, the negative electrode tab lead manufactured as above and the active material uncoated portions of the nine negative electrodes were collectively welded with ultrasonic waves. This was used as the electrode stack.

As illustrated in FIGS. 1 and 2, prior to the aforementioned welding connection, the sealant including the the stack including the polypropylene layer (with a thickness of 50 μm) and the acid modified polypropylene layer (with a thickness of 50 μm and a melting point of 130° C. to 140° C.) was thermally bonded in advance in the portion to be sealed by the package on both surfaces of the positive electrode tab lead and the negative electrode tab lead. On this occasion, the sealant was thermally bonded so that the acid modified polypropylene layer was directed to the tab lead side. The size of the sealant was set so that the sealant protruded by 2 mm to each side in the width direction of the lead terminal. At the protruding portion, the acid modified polypropylene layers were bonded to each other. The width of the sealant in the direction of the length of the tab lead was 12 mm.

On the other hand, as the laminated film for the package, the film formed of the stack including nylon with a thickness of 25 μm, soft aluminum with a thickness of 40 μm, and polypropylene with a thickness of 40 μm was used. This film was cut into a predetermined size. The cutout film was deeply drawn and molded into a cup shape within which the electrode stack can be housed. After the molding, the molded body was trimmed while the brim part around the cup portion was left as a side with a width of 15 mm. Into the cup portion of the laminated film molded in this manner, the electrode stack with the tab lead connected was housed. The electrode stack was disposed so that the tab leads were positioned at two positions on the brim part of the trimmed film. The sealant that was bonded to the tab lead in advance protruded inward and outward by 1 mm each over the brim part.

Next, the laminated film was cut into a predetermined size and then deeply dawn and molded into a cup shape in the same manner as described above. The obtained molded body was installed on the cup portion so that the inner resin layer was directed inward. Next, the brim part of the side of the package film from which the tab lead was extracted was pressed while heat was applied thereto. In this manner, the laminated films were thermally bonded and sealed by a width of 9.5 to 10 mm. On this occasion, the sealant and the laminated film that were bonded to the tab lead in advance were also bonded. Thus, the tab lead was strictly sealed. Next, one of the two sides adjacent to the sealed sides of the tab lead was heat sealed. Then, the electrolyte solution was poured into the electrode stack through the other side that was not sealed. The electrolyte solution contained 1 mol/l of $LiPF_6$ as the support salt and the mixed solvent of propylene carbonate and methyethyl carbonate as the solvent (at a weight ratio of 50:50). After the solution was poured, the foam was removed under reduced pressure. Then, with the use of a vacuum sealing machine, the other side was heat sealed under reduced pressure. Thus, the battery was completed. The attained capacity was 3 Ah.

For evaluating the tab sealing reliability, the tensile test was carried out. The test was conducted a plurality of times. Two batteries were manufactured for evaluation of the tensile test. A part of the heat-sealed portion where the negative electrode tab lead was extracted in one of the batteries was cut out before the electrolyte solution was sealed. The cutout part includes the negative electrode tab lead. From a part of the cutout heat-sealed portion, a strip-shaped laminated film was cut out to have the same width as the negative electrode tab lead. Next, the strip-shaped laminated film bonded to the negative electrode tab lead was peeled from the negative electrode tab lead using a tensile stress measuring machine. The tensile strength at this point of time was defined as the initial strength. The other battery was charged and discharged five times after the electrolyte solution was poured and then the battery was disassembled. Here, the tensile strength measured in the manner similar to the previous measurement was defined as the strength after the evaluation. The evaluation was based on the strength after evaluation/value of initial strength (%). The results are shown in Table 1.

Examples 7 to 9

Tab leads were manufactured under various reaction conditions as described in Examples 2 to 4, by using the polymethacrylic acid (abbreviation: PMAA, 35 to 45% aqueous solution, product name "poly(methacrylic acid sodium salt)" of Sigma-Aldrich) instead of polyacrylic acid. In the manner similar to Examples 2 to 4, the Raman spectroscopic analysis, the manufacture of the batteries, and the tensile tests were carried out. The results are shown in Table 1.

TABLE 1

| Standard | Condition of forming surface treatment film | | Raman spectroscopic analysis | | | | | | Sealing reliability |
|---|---|---|---|---|---|---|---|---|---|
| | | | Peak intensity | | | Intensity ratio | | | Tensile strength After-evaluation/ initial (%) |
| | Polycarboxylic acid | Reaction condition | CH | COOH | Acid anhydride | COOH/CH (%) | Acid anhydride/ CH (%) | Acid anhydride/ COOH (times) | |
| Example 1 | PAA | 120° C. 60 h | 63 | 28 | 35 | 44% | 56% | 1.3 | 87% |
| Example 2 | PAA | 120° C. 72 h | 119 | 14 | 52 | 12% | 44% | 3.7 | 87% |
| Example 3 | PAA | 120° C. 84 h | 92 | 17 | 47 | 18% | 51% | 2.8 | 92% |
| Example 4 | PAA | 120° C. 96 h | 68 | 14 | 41 | 21% | 60% | 2.9 | 100% |
| Example 5 | PAA | 120° C. 108 h | 96 | 11 | 42 | 11% | 44% | 3.8 | 93% |
| Example 6 | PAA | 120° C. 120 h | 129 | 15 | 56 | 12% | 43% | 3.7 | 93% |
| Example 7 | PMAA | 120° C. 72 h | 198 | 14 | 52 | 7% | 26% | 3.7 | 87% |
| Example 8 | PMAA | 120° C. 96 h | 153 | 17 | 47 | 11% | 31% | 2.8 | 92% |
| Example 9 | PMAA | 120° C. 120 h | 113 | 14 | 41 | 12% | 36% | 2.9 | 100% |
| Comparative Example 1 | PAA | 100° C. 1 h | 42 | 32 | 0* | 76% | — | — | 3% |
| Comparative Example 2 | PAA | 100° C. 2 h | 60 | 13 | 0* | 22% | — | — | 7% |
| Comparative Example 3 | PAA | 250° C. 48 h | 20 | 0* | 0* | — | — | — | 3% |

*The peak with an intensity of 5 or less was evaluated as 0 because of "noise" and "determination impossible".

As is clear from Table 1, it was confirmed that the tab lead with the surface treatment film formed of the material including polymer with acid anhydride groups had the excellent tab sealing reliability. The amount of carbon (attached carbon) in the surface treatment film in Examples 1 and 4 and Comparative Examples 1 to 3 was measured by the high-frequency combustion-infrared absorption method. The results are shown in Table 2.

TABLE 2

| Standard | Amount of carbon ($\mu g/cm^2$) |
| --- | --- |
| Example 1 | 11.3 |
| Example 4 | 11.0 |
| Comparative Example 1 | 11.4 |
| Comparative Example 2 | 11.4 |
| Comparative Example 3 | 8.5 |

As shown in Table 2, the amount of attached carbon in the surface treatment film was hardly different among Examples 1 and 4 and Comparative Examples 1 and 2. On the other hand, in Comparative Example 3, a part of the polymer of the film was decomposed so that the amount of attached carbon was smaller.

The tab lead according to the embodiment of the present disclosure may be any of the following first to eighth tab leads.

The first tab lead is a tab lead for a leading terminal to be used for a nonaqueous electrolyte secondary battery whose inside and outside are partitioned by having sealing resin bonded to the leading terminal, wherein a surface treatment film formed of a material including a polymer with carboxylic acid anhydride groups as functional groups is formed at an adhesion interface between tab lead metal and the sealing resin.

The second tab lead is the first tab lead, wherein the material including the polymer included in the surface treatment film has both structures of the carboxylic acid anhydride groups and carboxylic groups as the functional groups.

The third tab lead is the second tab lead, wherein the number of carboxylic acid anhydride groups is more than the number of carboxylic groups.

The fourth tab lead is the second or third tab lead, wherein the Raman spectroscopic analysis of the material including the polymer included in the surface treatment film indicates that peak intensity of the carboxylic acid anhydride group is higher than peak intensity of the carboxylic group.

The fifth tab lead is any of the first to fourth tab leads, wherein the amount of carbon in the surface treatment film is 10 $\mu g/cm^2$ or more by a high-frequency combustion-infrared absorption method.

The sixth tab lead is any of the first to fifth tab leads, wherein the tab lead metal is selected from nickel, copper, and aluminum.

The seventh tab lead is any of the first to sixth tab leads, wherein the surface treatment film is formed by applying a solution of polycarboxylic acid on the tab lead metal and then performing heat treatment.

The eighth tab lead is the seventh tab lead, wherein the polycarboxylic acid is polyacrylic acid, polymethacrylic acid, or a salt thereof.

The nonaqueous electrolyte secondary battery according to the embodiment may be the following first or second secondary battery.

The first nonaqueous electrolyte secondary battery is a nonaqueous electrolyte secondary battery wherein the sealing resin for partitioning the inside and outside of the battery is bonded to any of the first to eighth tab leads and this tab lead is used as a leading terminal of at least one of a positive electrode and a negative electrode.

The second nonaqueous electrolyte secondary battery is the first nonaqueous electrolyte secondary battery, wherein a package including a laminated film is used as the package.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A tab lead for a secondary battery, comprising
tab lead metal,
the tab lead metal comprising an adhesion interface with a sealing resin,
wherein the adhesion interface is provided with a surface treatment film formed of a polymer with carboxylic acid anhydride groups and carboxylic groups,
wherein the polymer is formed by:
applying to the tab lead metal a solution consisting essentially of water and a polycarboxylic acid; and
heating the tab lead metal with the applied solution to form the polymer with carboxylic acid anhydride groups and carboxylic groups.

2. The tab lead for a secondary battery according to claim 1, wherein the tab lead metal comprises at least one metal selected from nickel, copper, and aluminum.

3. The tab lead for a secondary battery according to claim 1, wherein peak intensity of the carboxylic acid anhydride group is greater than peak intensity of the carboxylic group in a Raman spectroscopic analysis of the surface treatment film.

4. The tab lead for a secondary battery according to claim 1, wherein the polycarboxylic acid is polyacrylic acid, polymethacrylic acid, or a salt thereof.

5. The tab lead for a secondary battery according to claim 1, wherein the polymer is a crosslinked polyacrylic acid.

6. The tab lead for a secondary battery according to claim 1, wherein the polymer is a crosslinked polymethacrylic acid.

7. The tab lead for a secondary battery according to claim 1, wherein the surface treatment film comprises carbon in an amount greater than or equal to 10 $\mu g/cm^2$ when measured by a high-frequency combustion-infrared absorption method.

8. The tab lead for a secondary battery according to claim 1,
wherein the tab lead metal with the applied solution is heated on a hot plate.

9. The tab lead for a secondary battery according to claim 1, wherein the number of the carboxylic acid anhydride groups in the polymer is greater than the number of the carboxylic groups.

10. The tab lead for a secondary battery according to claim 9,
wherein peak intensity of the carboxylic acid anhydride group is greater than peak intensity of the carboxylic group in a Raman spectroscopic analysis of the surface treatment film.

11. The tab lead for a secondary battery according to claim 9,
wherein the tab lead metal comprises at least one metal selected from nickel, copper, and aluminum.

12. A nonaqueous electrolyte secondary battery comprising the tab lead according to claim 1 as a leading terminal of at least one of a positive electrode and a negative electrode.

13. The nonaqueous electrolyte secondary battery according to claim 12, comprising a package for the secondary battery including a laminated film.

14. A nonaqueous electrolyte secondary battery comprising
the tab lead according to claim 9 as a leading terminal of at least one of a positive electrode and a negative electrode.

15. The nonaqueous electrolyte secondary battery according to claim 14, comprising a package for the secondary battery including a laminated film.

\* \* \* \* \*